United States Patent
Yokosuka (10) Patent No.: US 10,793,217 B2
(45) Date of Patent: Oct. 6, 2020

(54) SADDLE-TYPE VEHICLE

(71) Applicant: HONDA MOTOR CO., LTD., Minato-ku, Tokyo (JP)

(72) Inventor: Mitsuhito Yokosuka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 27 days.

(21) Appl. No.: 16/142,046

(22) Filed: Sep. 26, 2018

(65) Prior Publication Data
US 2019/0092412 A1 Mar. 28, 2019

(30) Foreign Application Priority Data
Sep. 28, 2017 (JP) .................. 2017-187380

(51) Int. Cl.
*B62J 29/00* (2006.01)
*B62J 17/00* (2020.01)
*B62J 6/05* (2020.01)

(52) U.S. Cl.
CPC .................. *B62J 29/00* (2013.01); *B62J 6/05* (2020.02); *B62J 17/00* (2013.01)

(58) Field of Classification Search
CPC ... B62J 17/00; B62J 29/00; B62J 17/02; B62J 17/04; B62J 6/005; B60J 5/0404; B60J 5/0416; B60J 5/0429; B60J 5/0436; B60J 5/0441; B60J 5/0451; B60J 10/76; B60J 10/78
USPC ....... 296/1.11, 152, 180.1, 146.6, 97.8, 97.1, 296/78.1, 63, 214, 70, 37.7; 359/871, 359/841, 872, 507, 844, 850, 509, 549, 359/868, 877
See application file for complete search history.

(56) References Cited

U.S. PATENT DOCUMENTS 3,971,452 A    7/1976   Morelli
4,911,494 A *   3/1990   Imai .................. B62J 17/00
                                                        296/180.1

(Continued)

FOREIGN PATENT DOCUMENTS

JP    60-152448    12/1975
JP    11-029080    2/1999

(Continued)

OTHER PUBLICATIONS

Japanese Office Action for Japanese Patent Application No. 2017-187380 dated Mar. 26, 2019.

*Primary Examiner* — D Glenn Dayoan
*Assistant Examiner* — Sunsurraye Westbrook
(74) *Attorney, Agent, or Firm* — Amin, Turocy & Watson, LLP (57) ABSTRACT

A saddle-type vehicle is equipped with a rearview mirror. The rearview mirror includes a stay extending from a vehicle body outward in a vehicle width direction, and a housing connected to an extending end portion of the stay and extending outward in the vehicle width direction, the housing including a mirror body. The housing further includes an upper wall and a lower wall which are arranged at positions overlapping each other in the vertical direction of the vehicle body. The upper wall has an upper outer surface portion whose length in a front-rear direction is shorter than the length of a lower outer surface portion of the lower wall in the front-rear direction, as viewed in a cross-sectional view perpendicular to the vehicle width direction.

6 Claims, 6 Drawing Sheets

(56) References Cited

U.S. PATENT DOCUMENTS

| | | | |
|---|---|---|---|
| 7,510,229 B2* | 3/2009 | Katagiri | B62J 29/00 296/78.1 |
| 8,123,273 B2* | 2/2012 | Tsuda | B62J 17/04 296/180.1 |
| 8,177,250 B2* | 5/2012 | Fukuyama | B62J 17/00 280/288.4 |
| 8,899,668 B2* | 12/2014 | Yokouchi | B62J 17/00 296/180.1 |
| 9,440,702 B2* | 9/2016 | Tako | B62J 6/02 |
| 2003/0179087 A1 | 9/2003 | Stahel | |
| 2016/0288853 A1 | 10/2016 | Ishii et al. | |

FOREIGN PATENT DOCUMENTS

| | | |
|---|---|---|
| JP | 2003-127936 | 5/2003 |
| JP | 2015-096415 | 5/2015 |

\* cited by examiner

SADDLE-TYPE VEHICLE

CROSS-REFERENCE TO RELATED APPLICATION

This application is based upon and claims the benefit of priority from Japanese Patent Application No. 2017-187380 filed on Sep. 28, 2017, the contents of which are incorporated herein by reference.

BACKGROUND OF THE INVENTION

Field of the Invention

The present invention relates to a saddle-type vehicle having a rearview mirror.

Description of the Related Art

As motorcycles (saddle-type vehicles) and four wheel vehicles, there has been one having a configuration that causes traveling wind (flow of air) generated during traveling to produce a down force and then utilizes the down force for traveling. That is, because the vehicle body is pressed downward by the down force, the road surface follow-up property (tire grip) is improved, so that the steering performance or the like is stabilized.

For example, Japanese Laid-Open Patent Publication No. 2015-096415 discloses a saddle-type vehicle utilizing such a down force. The saddle-type vehicle has a pair of mirror stays attached to the vehicle body and mirror bodies attached to the respective mirror stays on outer sides in the vehicle width direction. Further, in the saddle-type vehicle, the mirror stays are provided with aerodynamic devices, and the down forces are generated at the mirror stays.

SUMMARY OF THE INVENTION

However, the mirror stays are usually provided at places that are not separated so much from the center portion in a vehicle width direction of the vehicle. Therefore, in the configuration in which down forces are produced at the mirror stays as disclosed in Japanese Laid-Open Patent Publication No. 2015-096415, the down forces are produced in the vicinity of the axle shaft, and consequently a problem arises in that it is difficult to sufficiently obtain the effects of the down forces. If each mirror stay is elongated outward in the vehicle width direction and also elongated in the front-rear direction for the purpose of producing a larger down force, inconveniences would arise such as deterioration in the visibility of the mirror from the rider, deterioration in design, and the like.

The present invention has been made in connection with the technical field of aerodynamics in the saddle-type vehicle as described above, and it is an object of the present invention to provide a saddle-type vehicle capable of producing a down force satisfactorily and thereby traveling further stably.

The saddle-type vehicle according to the present invention has the following features.

First feature: A saddle-type vehicle is provided with a rearview mirror, and the rearview mirror includes a stay extending from a vehicle body outward in a vehicle width direction, and a housing connected to an extending end portion of the stay and extending outward in the vehicle width direction, the housing including a mirror body. The housing further includes an upper wall and a lower wall which are arranged at positions overlapping each other in a vertical direction of the vehicle body, and in a cross-sectional view perpendicular to the vehicle width direction, the upper wall has an upper outer surface portion whose length in a front-rear direction is shorter than the length of a lower outer surface portion of the lower wall in the front-rear direction.

Second feature: In the side cross-sectional view, an external surface of the upper outer surface portion is formed in a concave surface whose center portion in the front-rear direction is depressed downward.

Third feature: The housing is provided with a protruding portion protruding upward at an end portion thereof on an outer side in the vehicle width direction.

Fourth feature: The housing is provided with a protruding portion protruding downward at an end portion thereof on an outer side in the vehicle width direction.

Fifth feature: The protruding portion continuously extends in the front-rear direction from a front end to a rear end of the upper outer surface portion.

Sixth feature: The protruding portion protrudes rearward beyond a rear end of the upper outer surface portion.

Seventh feature: A blinker device is disposed inside the housing.

According to the aforementioned first feature, in the saddle-type vehicle, the housing of the rearview mirror has, on the upper wall, the upper outer surface portion whose length in the front-rear direction is shorter than the length of the lower outer surface portion of the lower wall in the front-rear direction. With this feature, a down force is suitably produced during traveling due to the housing. That is, the traveling wind (air) flowing a long distance along the lower outer surface portion flows fast, while the traveling wind (air) flowing a short distance along the upper outer surface portion flows slow, and hence a pressure applied to the upper outer surface portion becomes larger than a pressure applied to the lower outer surface portion. Thus, the saddle-type vehicle is able to obtain the down force stably on the outer side in the vehicle width direction, which is separated sufficiently from the axle shaft. Accordingly, the saddle-type vehicle is capable of having an improved road-surface follow-up property of wheels or the like and traveling further stably.

According to the second feature, in the saddle-type vehicle, the upper outer surface portion has the concave surface whose center portion in the front-rear direction is depressed downward, whereby it is possible to suitably receive the pressure of the traveling wind (air) coming from ahead and smoothly flow the air obliquely upward toward the rear side. Accordingly, it is possible to produce the down force more easily.

According to the third feature, the housing is provided with the protruding portion protruding upward at the end portion on the outer side in the vehicle width direction, and thus it is possible to prevent occurrence of the wing tip vortex produced by the down force on the outer side in the vehicle width direction. Accordingly, it is possible for the saddle-type vehicle to suppress the down-force loss caused by the wing tip vortex and to travel stably and efficiently.

According to the fourth feature, the housing is provided with a protruding portion protruding downward. Also in this case, it is possible to suppress occurrence of the wing tip vortex caused by the down force on the outer side in the vehicle width direction.

According to the fifth feature, the protruding portion continuously extends from the front end to the rear end at the end portion on the outer side in the vehicle width direction.

With this feature, it is possible to suppress occurrence of the wing tip vortex throughout the upper outer surface portion.

According to the sixth feature, the protruding portion protrudes rearward beyond the rear end of the upper outer surface portion. With this feature, it is also possible to prevent the wing tip vortex from occurring on the rear side of the upper outer surface portion.

According to the seventh feature, since the saddle-type vehicle has the blinker device inside the housing, it is possible to effectively utilize an interior space of the housing which is configured to be large in size in order to gain the down force.

The above and other objects, features, and advantages of the present invention will become more apparent from the following description when taken in conjunction with the accompanying drawings in which preferred embodiments of the present invention are shown by way of illustrative examples.

DESCRIPTION OF THE PREFERRED EMBODIMENTS

Hereinafter, the present invention will be described in detail based on preferred embodiments with reference to the accompanying drawings.

Figure 1:
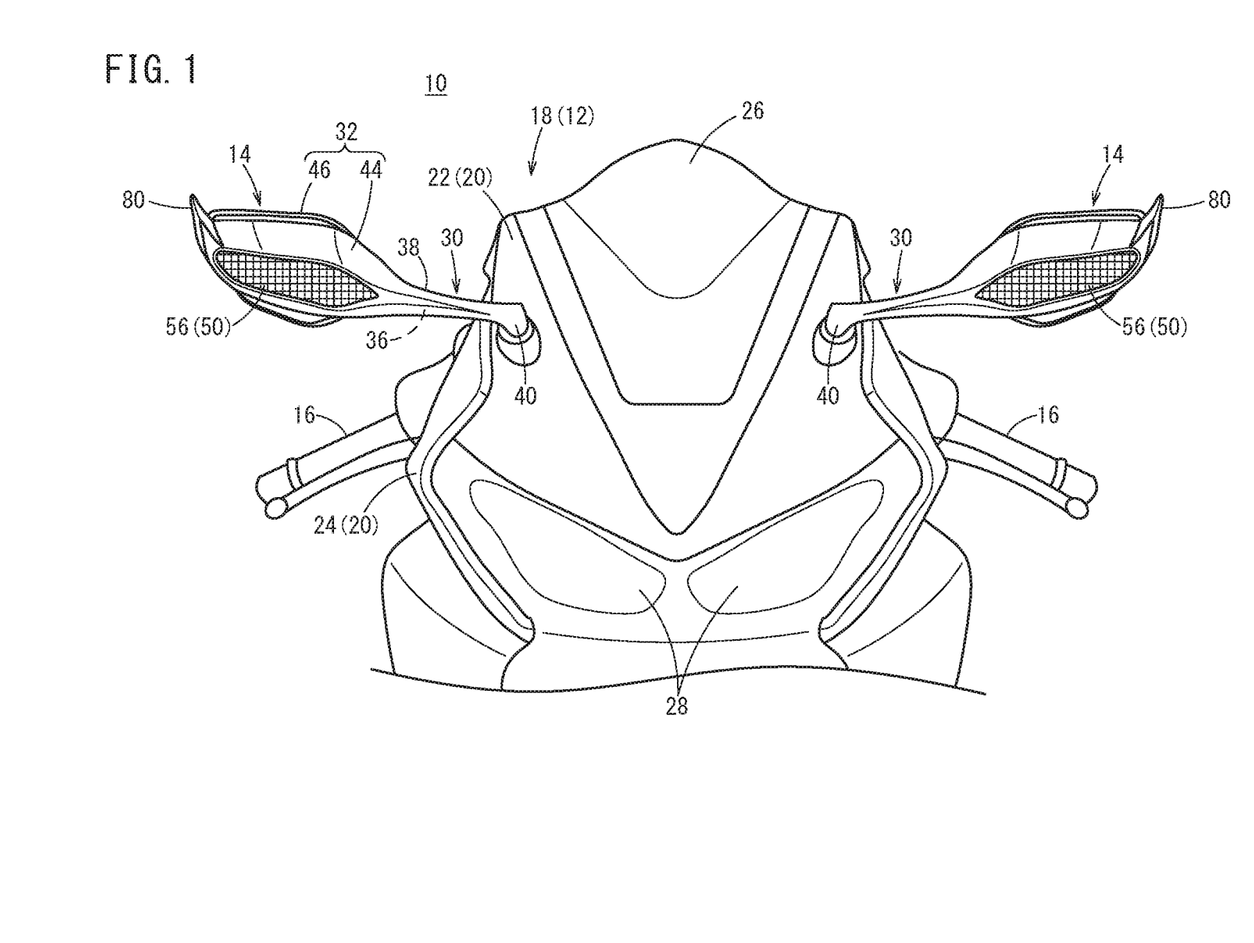
FIG. 1 is a front view showing part of a saddle-type vehicle according to a first embodiment of the present invention.

As shown in FIG. 1, a saddle-type vehicle 10 (hereafter, referred to simply as a vehicle 10) according to an embodiment of the present invention is equipped with a pair of right and left rearview mirrors 14 on a front side of a vehicle body 12. The pair of rearview mirrors 14 enable the user (i.e., rider) to confirm the situation of the right and left rear during the traveling of the vehicle 10.

According to the present invention, at the pair of the rearview mirrors 14, down forces (aerodynamic forces) are produced during traveling. In the following, unless otherwise indicated in particular, the rearview mirror 14 provided on the right side of the vehicle body 12 as viewed from the rider on the vehicle 10 will be described as a representative example. Of course, a configuration being symmetrical with the right rearview mirror 14 is provided also on the rearview mirror 14 provided on the left side of the vehicle body 12 as viewed from the rider on the vehicle 10.

The vehicle 10 has a front wheel which is a steered wheel and a rear wheel which is a drive wheel (neither of them are shown). The front wheel is rotatably supported at lower ends of front forks (not shown). Handlebars 16 are connected to upper ends of the front forks. In the vehicle 10, when the handlebars 16 are steered by the rider, the front forks and the front wheel are integrally pivoted right and left about a head pipe of a vehicle frame (not shown). On the other hand, when given an appropriate driving force transmitted from an engine (not shown) by the operation of the user, the rear wheel rolls on a traveling path to propel the vehicle 10.

Further, as shown in FIG. 1, a front structure 18 of the vehicle body 12 is equipped with a cowl 20 covering the front forks and constituting the exterior of the vehicle body 12. For example, the cowl 20 has a front cowl 22 covering the front side of the front structure 18, a pair of side cowls 24 connected to respective both sides of the front cowl 22 and covering the right and left sides of the front structure 18, and an inner cowl (not shown) connected to inner sides of the pair of side cowls 24 in the width direction and covering the rear side of the front structure 18.

As viewed from the front side of the vehicle body 12, the front cowl 22 is formed in a substantially V-shape which, as the same goes rearward, extends from the center portion in the vehicle width direction toward the outsides in the vehicle width direction and toward the upper side. Further, a screen 26 is installed on the upper inner side of the front cowl 22. The screen 26 causes traveling wind (flowing air) received from the front side during the traveling of the vehicle 10 to flow rear-upward and rear-outward in the vehicle width direction. Further, a pair of right and left headlights 28 are provided on the lower side of the front cowl 22.

The pair of rearview mirrors 14 are fixedly connected to the front cowl 22 at predetermined height positions (i.e., as viewed from the front side, at positions that are located higher than the position of the handlebars 16 and lateral to the screen 26 in the vehicle width direction). The rearview mirrors 14 extend outward (in opposite directions) in the vehicle width direction and are slightly slanted upward.

Each rearview mirror 14 has a stay 30 whose end portion fixed to the vehicle body 12 and extending outward in the vehicle width direction, a housing 32 connected to the other end portion of the stay 30, and a mirror body 34 (refer to FIG. 3) secured to the housing 32 and facing rearward. Although not limited in particular, the entire protruding length (length in the vehicle width direction) of each rearview mirror 14 may be longer than the protruding length of the handlebar 16 which protrudes outward in the vehicle width direction, as viewed from the front side. With this structure, it becomes possible for the pair of rearview mirrors 14 to receive down forces more satisfactorily.

Each stay 30 is a portion of the rearview mirror 14 that is elongated thinly, and has a predetermined length from one end portion to the other end portion in the vehicle width direction (for example, about 0.5 to 0.9 times the length of the housing 32 in the vehicle width direction). The stay 30 is formed to be sufficiently thin (for example, to be thinner than the grip of the handlebar 16) and thus, the visibility of the front direction and obliquely downward direction of the vehicle body 12 is ensured.

For example, the stay 30 is configured to include a core portion 36 made, as a hard member, of a metal material or the like, and a resin cover 38 configuring the exterior by covering the periphery of the core portion 36. In the cross-sectional view, the resin cover 38 is formed in a substantially triangular shape having a rounded corner on the front side, whereby the influence of the traveling wind received from the front side is reduced. Incidentally, the stay 30 is not particularly limited in configuration, and may be configured to have a rigid structure made up of the resin cover 38 only.

Alternatively, the stay 30 may be made up of only a rod-shaped member (the core portion 36) of a metal material.

One end portion of the stay 30 has a coupling structure 40 thicker than the extending portion and is firmly fixed to the vehicle body 12 (more specifically, to the front cowl 22) by the coupling structure 40. Although not limited in particular, the coupling structure 40 may have a configuration in which, for example, in addition to fastening and fixing by using bolts (not shown), mutual positioning and fixing are ensured by providing a hole of a polygonal shape on one of the one end portion of the stay 30 and the vehicle body 12 and by fitting in this hole a projection portion of the polygonal shape provided on the other one. By this kind of coupling structure 40, the stay 30 immovably supports the whole of the rearview mirror 14 on the vehicle body 12. Incidentally, the rearview mirror 14 may have a configuration in which the stay 30 is joined to the vehicle body 12 in an angular-adjustable manner.

On the other hand, the other end side of the stay 30 is also joined to and supports the housing 32 by a coupling structure (not shown, by, for example, a configuration or the like in which the core portion 36 is insert-molded into a portion constituting a frame of the housing 32). Further, in the present embodiment, the resin cover 38 of the stay 30 and the housing 32 are integrally formed so as to have a smoothly joined exterior appearance.

Figure 2:
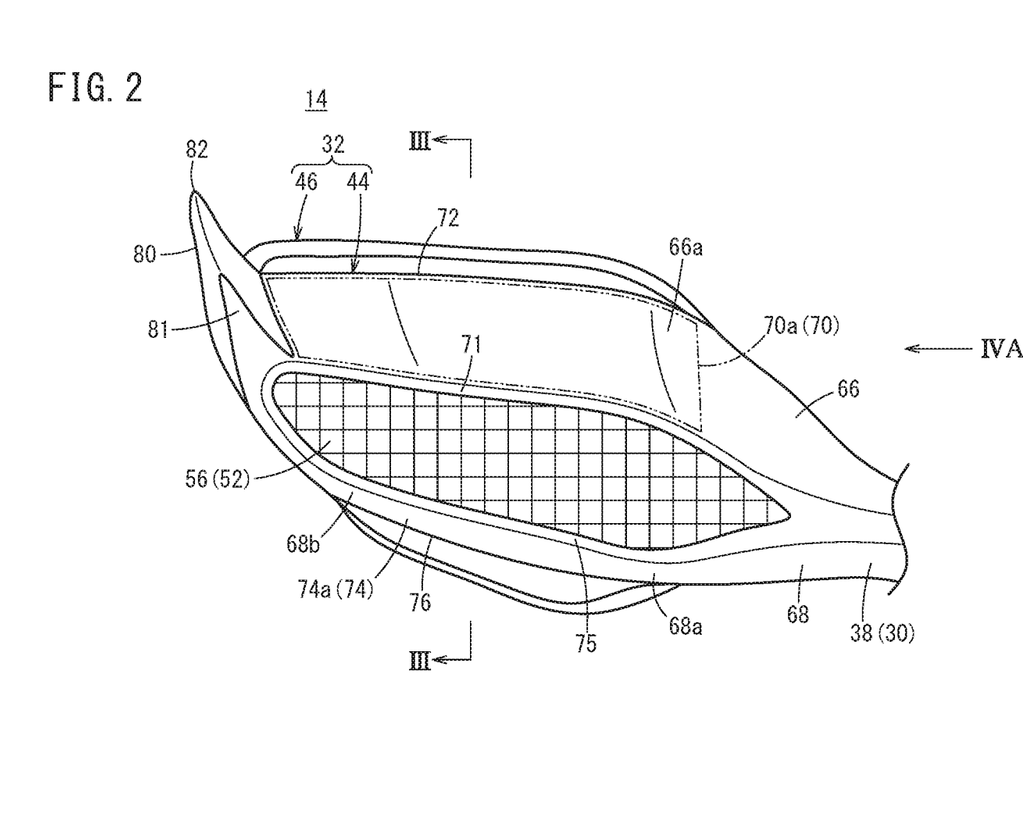
FIG. 2 is a front view showing a rearview mirror in an enlarged scale.
Figure 3:
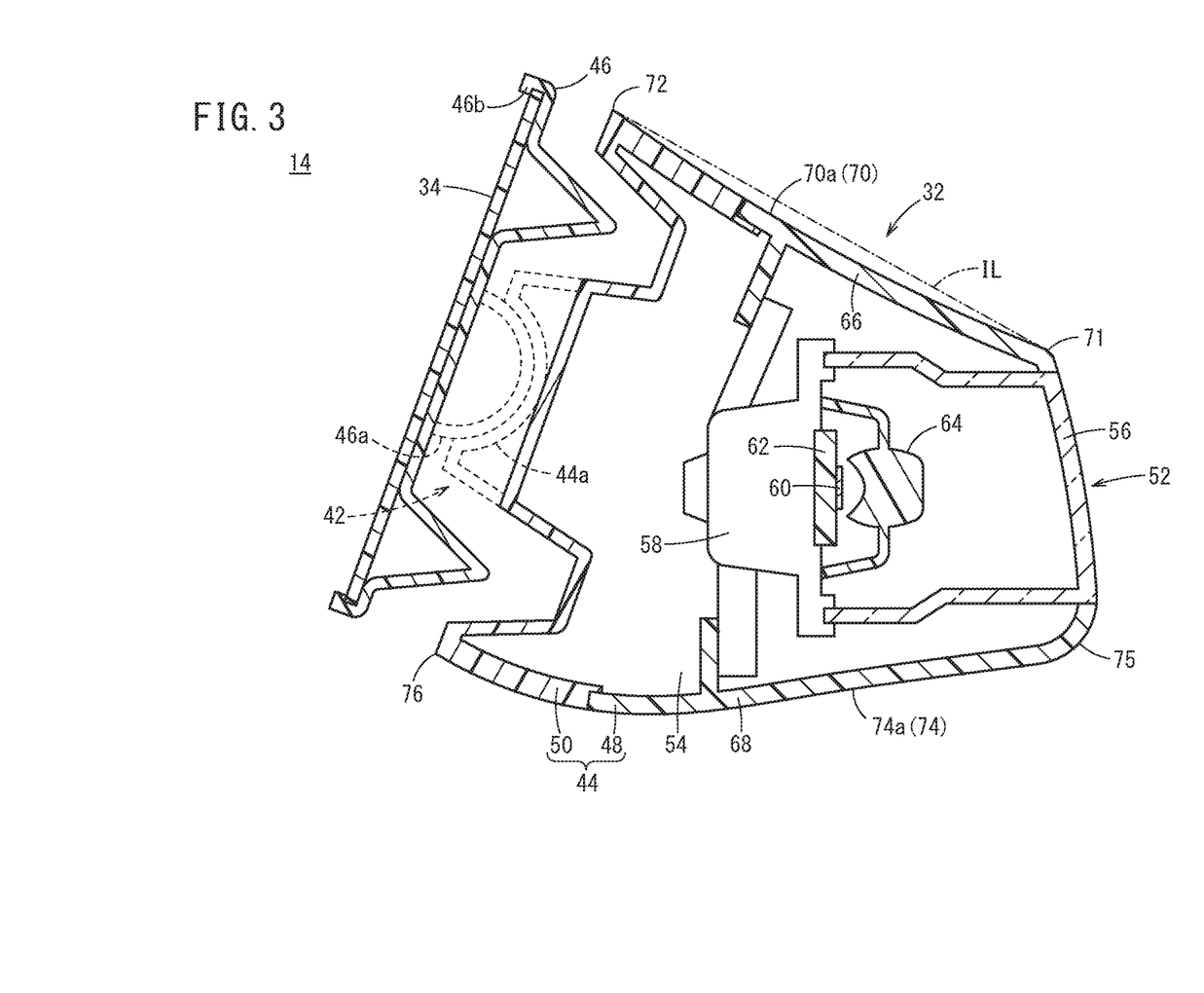
FIG. 3 is a cross-sectional view taken along the III-III line in FIG. 2.

As shown in FIG. 2, the housing 32 has several times the thickness of the stay 30 in the vertical direction. Further, the dimension of the housing 32 in the front-rear direction (vehicle length direction) is longer than the thickness of the housing 32 in the vertical direction. As shown in FIG. 3, the housing 32 has an adjustment mechanism 42 which supports the mirror body 34 in an angular-adjustable manner.

Specifically, the housing 32 is made up of a fixed housing 44 and a movable housing 46. The fixed housing 44 is a member secured to the stay 30 and has a support portion for the adjustment mechanism 42 on the rear side. On the other hand, the movable housing 46 is a member directly holding the mirror body 34 and has a movable portion of the adjustment mechanism 42 on the front side.

For example, the adjustment mechanism 42 includes a hemispheric concave portion 44a (the support portion, refer to the broken line in FIG. 3) formed on the fixed housing 44 and a spherical convex portion 46a (the movable portion, refer to the broken line in FIG. 3) formed on the movable housing 46 and inserted into the concave portion 44a. Then, the concave portion 44a and the convex portion 46a are in engagement with each other under an appropriate friction force. When the user operates the movable housing 46, the movable housing 46 is inclined relative to the fixed housing 44 against the friction force between the concave portion 44a and the convex portion 46a. The adjustment mechanism 42 maintains the state of inclination.

The mirror body 34 is formed in a flat plate shape, and is firmly secured by being hooked on an edge portion 46b provided at a base end portion of the movable housing 46. The user adjusts the angle of the movable housing 46 to thereby position the movable housing 46 at a desired angle, whereby the mirror body 34 enables the user to visibly confirm the rear of the vehicle 10.

Further, the housing 32 (the fixed housing 44) includes a first member 48 formed in a cup shape elongated in the vehicle width direction and provided on the front side, and a second member 50 secured to the rear side of the first member 48 and having the concave portion 44a (the adjustment mechanism 42). The housing 32 has a blinker device 52 built inside. The blinker device 52 is fixedly held on the front side within an interior space 54 defined inside the first member 48 and the second member 50. The blinker device 52 is equipped with an outer lens 56 fixed to the front side of the first member 48, a base member 58 fixed inside the fixed housing 44, a circuit board 62 supported by the base member 58 and on which a light emitting element 60 is mounted, and an inner lens 64 disposed between the outer lens 56 and the circuit board 62.

Because of having been given appropriate processing, the outer lens 56 prevents the interior of the fixed housing 44 from being viewed. The outer lens 56 has an upper end portion positioned on the rear side relative to a lower end portion, and the outer surface is inclined upward and rearward as a whole. Incidentally, the inner lens 64 of the blinker device 52 scatters irradiation light from the light emitting element 60 in appropriate directions (vehicle width direction or the like).

As shown in FIGS. 2 and 3, the fixed housing 44 has an upper wall 66 and a lower wall 68 which extend so as to vertically bifurcate at the joined portion (extending end portion) with the stay 30, in order to be adapted for the installation of the outer lens 56 of the blinker device 52. As viewed from the front side, the upper wall 66 extends from the joined portion so as to be inclined obliquely upward toward the outer side in the vehicle width direction and further extends from a curved portion 66a at a halfway position outward in the vehicle width direction. On the other hand, as viewed from the front side, the lower wall 68 extends from the joined portion outward in the vehicle width direction, further extends from a first curved portion 68a so as to be gently inclined obliquely upward toward the outer side in the vehicle width direction, and then extends from a second curved portion 68b so as to be sharply inclined upward toward the outer side in the vehicle width direction. The outer lens 56 of the blinker device 52 is encircled vertically and horizontally by the upper wall 66 and the lower wall 68.

Then, the housing 32 (the fixed housing 44) of the rearview mirror 14 is configured to be capable of producing the down force during the traveling of the vehicle 10. Specifically, in the assembled state of the first member 48 and the second member 50, the upper wall 66 of the fixed housing 44 has an upper outer surface portion 70 which extends smoothly in the front-rear direction as viewed in a side cross-sectional view perpendicular to the vehicle width direction. The external surface of the upper outer surface portion 70 is formed in a concave surface 70a recessed toward the interior space 54 side in the form of an arch (bow shape). Further, the lower wall 68 of the fixed housing 44 has a lower outer surface portion 74 which, in the assembled state of the first member 48 and the second member 50, is overlapped with the upper wall 66 in the vertical direction and whose dimension in the front-rear direction is longer than the length of the upper outer surface portion 70 in the front-rear direction.

Assuming that an imaginary straight line IL is drawn to connect a front end 71 to a rear end 72 in the side cross-sectional view, the upper outer surface portion 70 is inclined at a predetermined angle (for example, in the range of 10 to 40 degrees) relative to the horizontal direction of the vehicle body 12. Further, the concave surface 70a of the upper outer surface portion 70 is gently recessed or sagged toward the inside relative to the imaginary straight line IL. Because the concave surface 70a is recessed only slightly with respect to the imaginary straight line IL, the length of the concave surface 70a in the front-rear direction becomes sufficiently short.

Further, in the front view (refer to FIG. 2), the upper outer surface portion 70 extends from the curved portion 66a to an end portion on the outer side in the vehicle width direction. That is, the upper outer surface portion 70 covers the greater part (in the range of 80% or more) of the area of the upper wall 66 constituting the fixed housing 44. Further, the upper outer surface portion 70 extends in the vehicle width direction while maintaining the same cross-section shape. With this configuration, it is possible for the concave surface 70a to receive the pressure of traveling wind (flowing air) uniformly in the surface direction.

On the other hand, the external surface 74a of the lower outer surface portion 74 extends along an inner surface shape of the lower wall 68 constituting the interior space 54 of the fixed housing 44. The external surface 74a swells slightly downward from a front end 75 toward the rear side, and is inclined upward from the vicinity of the center portion in the front-rear direction (the attaching portion of the second member 50) toward a rear end 76.

In the fixed housing 44 as above, the length of the upper outer surface portion 70 (the concave surface 70a) in the front-rear direction is shorter than the length of the lower outer surface portion 74 (the external surface 74a) in the front-rear direction. Incidentally, the ratio of the length of the upper outer surface portion 70 in the front-rear direction to the length of the lower outer surface portion 74 in the front-rear direction may be properly designed in order to produce a sufficient down force.

When receiving a traveling wind (flowing air) from the front side, the fixed housing 44 causes the air to flow upward and downward. Then, the air directed to pass through the upper outer surface portion 70 flows a shorter distance along the upper outer surface portion 70, while the air directed to pass through the lower outer surface portion 74 flows a longer distance along the lower outer surface portion 74, than in the case of air flowing along the upper outer surface portion 70. Therefore, the pressure exerted on the lower outer surface portion 74 by the flowing air is lowered compared to the pressure exerted on the upper outer surface portion 70 by the flowing air. That is, a pressure difference is produced between the lower outer surface portion 74 and the upper outer surface portion 70, so that a pressure is applied to the upper outer surface portion 70 to press the housing 32 downward.

Figure 4A:
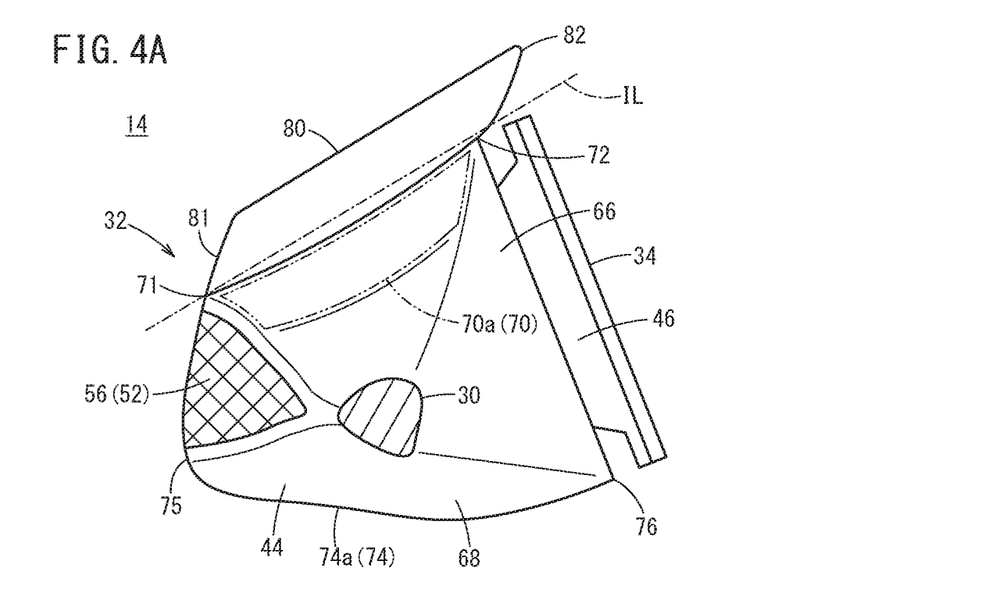
FIG. 4A is a side view of a housing as viewed from the arrow IVA direction in FIG. 2.

Furthermore, as shown in FIGS. 2 and 4A, the housing 32 according to the present embodiment has a winglet 80 (a protruding portion) at an end portion thereof on the outer side in the vehicle width direction. As viewed from the front side (refer to FIG. 2), the winglet 80 protrudes to slightly incline outward in the vehicle width direction as it extends upward from the end portion. The winglet 80 is molded integrally with the fixed housing 44, so that the protruding posture of the winglet 80 is firmly maintained.

The winglet 80 is formed on the entire side of the concave surface 70a in the front-rear direction (that is, from the first member 48 to the second member 50). Further, the winglet 80 has a triangular shape in cross section which has a wider width at a base portion (at a joined portion to the upper outer surface portion 70) and which becomes gradually narrower toward an apex portion on the upper side, and extends in the front-rear direction.

Although the protruding height of the winglet 80 protruding from the upper outer surface portion 70 is desirable to be as high as possible in order to obtain the functional effect (suppression of a wing tip vortex 100) as described later, the protruding height may be set to an appropriate height in light of the design property or the like of the rearview mirror 14. For example, the height of the winglet 80 is formed higher than the dimension (thickness) of the stay 30 in the vertical direction.

Further, a front end 81 of the winglet 80 is formed so as to be aligned in the surface direction with the outer lens 56 and the front end 71 of the upper outer surface portion 70. Thus, the design property is enhanced. Furthermore, a rear end 82 of the winglet 80 is formed to protrude further rearward beyond the rear end 72 of the upper outer surface portion 70.

Next, description will be given regarding the operation of the vehicle 10 having the aforementioned configuration according to the present embodiment.

Figure 4B:
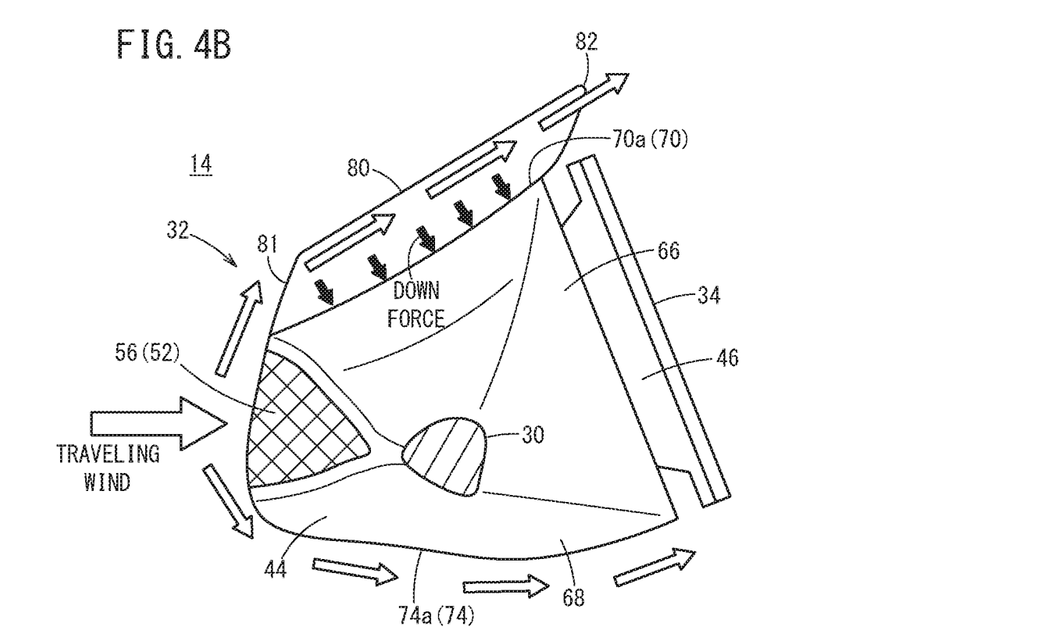
FIG. 4B is a side view illustrating the action of traveling wind during traveling.

The vehicle 10 receives traveling wind (air) by the vehicle body 12 from the front side during traveling and also receives traveling wind by the pair of rearview mirrors 14 protruding outward in the vehicle width direction. As described above, the housing 32 (the fixed housing 44) of the rearview mirror 14 causes the traveling wind to flow upward and downward. Then, as illustrated in FIG. 4B, the traveling wind on the upper side of the housing 32 flows along the upper outer surface portion 70 (along the concave surface 70a) toward the rear side of the housing 32, while the traveling wind on the lower side of the housing 32 flows along the lower outer surface portion 74 (the external surface 74a) toward the rear side of the housing 32.

As a result, the pressure applied by the traveling wind to the upper outer surface portion 70 is increased compared to the pressure applied by the traveling wind to the lower outer surface portion 74, whereby a down force is exerted on the upper outer surface portion 70. In particular, because the outer lens 56 of the blinker device 52 is inclined rearward and upward, large part of the traveling wind is easy to flow on the upper outer surface portion 70 side, so that a large down force can be expected.

The rearview mirror 14 transmits the down force of the housing 32 to the vehicle body 12 through the stay 30, whereby the vehicle body 12 is pressed downward. Then, as shown in FIG. 1, the pair of rearview mirrors 14 are protruded significantly toward the outer sides in the vehicle width direction and are able to receive the down force on the right and left outer sides in the vehicle width direction. Therefore, the vehicle body 12 is stably pressed downward, and hence it is possible to stabilize the traveling of the vehicle 10.

Here, assuming that a structure (aerodynamic device) for producing the down force is provided on each of the stays 30 of the rearview mirrors 14, in such a configuration, the down forces are produced in the vicinity of the center in the vehicle width direction. That is, because the down forces are applied to portions that are close to the axle shaft, the forces vary easily even when the axle shaft is tilted slightly. In contrast thereto, in the vehicle 10 according to the present embodiment, because the upper outer surface portions 70 are provided on the housings 32 which are located on the outer sides than the stays 30 in the vehicle width direction, it is possible to satisfactorily produce the down forces on the right and left outer sides of the vehicle body 12 in the vehicle width direction. As a result, the vehicle 10 is capable of traveling further stably.

Figure 5A:
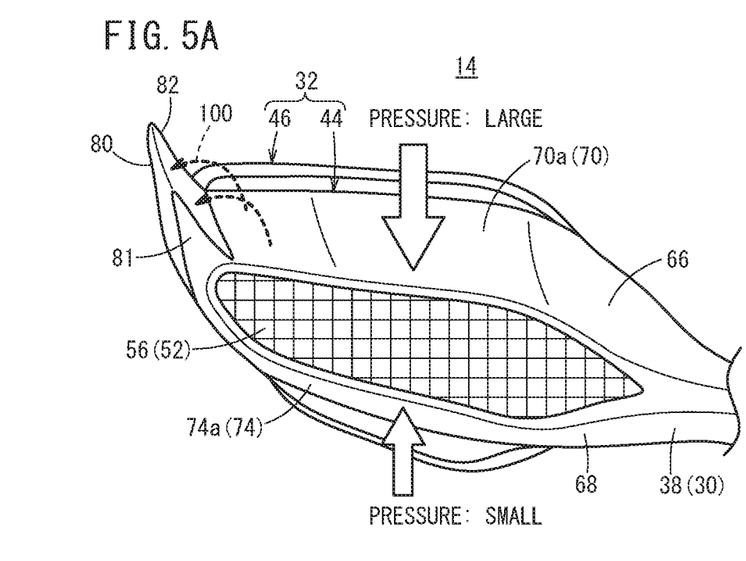
FIG. 5A is a front view illustrating the action of a winglet provided on the rearview mirror.
Figure 5B:
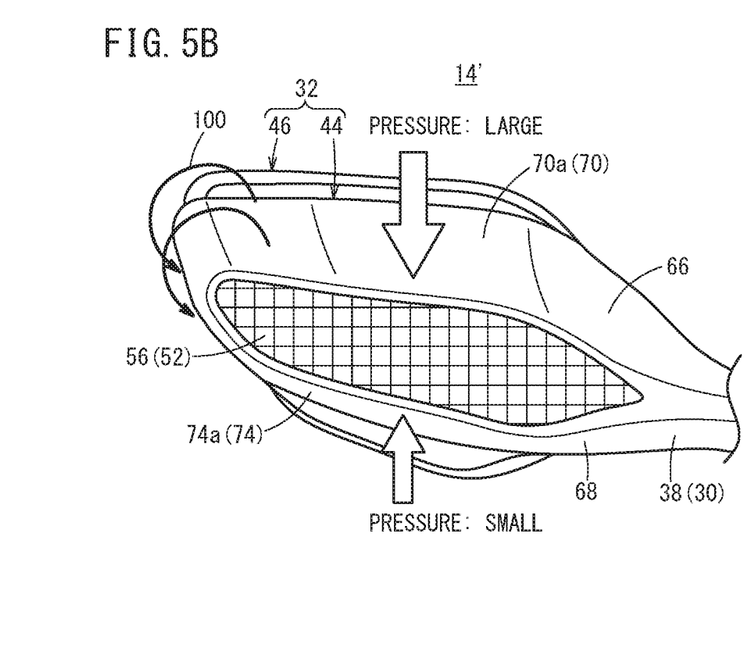
FIG. 5B is a front view illustrating generation of a wing tip vortex in the case where no winglet is provided.

Further, as shown in FIG. 5A, the winglet 80 provided on each rearview mirror 14 intercepts entrainment of the air flow from the upper outer surface portion 70 toward the lower outer surface portion 74 (i.e., preventing occurrence of the wing tip vortex 100). That is, assuming that a rearview mirror 14' is not provided with the winglet 80 as shown in FIG. 5B, when the down force is produced, a wing tip vortex 100 going from the upper wall 66 toward the lower wall 68 is generated at an end portion on the outer side in the vehicle width direction. This is because the pressure is high at the upper outer surface portion 70 and is low at the lower outer surface portion 74 so that the air flows from the upper side to the lower side. The wing tip vortex 100 results in imposing a load on the vehicle body 12. It is noted that the rearview mirror 14' also possesses the main configuration of the present invention because the effect of the down force can be obtained by the configuration of the upper outer surface portion 70 and the lower outer surface portion 74 of the rearview mirror 14'.

In contrast to this, as shown in FIG. 5A, the vehicle 10 according to the present embodiment intercepts flowing of the air because the winglet 80 exists at the flowing position of the wing tip vortex 100. That is, it is possible to reduce (or eliminate) the influence of the wing tip vortex 100. In particular, the wing tip vortex 100 is also generated at a further rear side of the rear end 72 of the upper outer surface portion 70. However, because the rear end 82 of the winglet 80 protrudes rearward beyond the upper outer surface portion 70, it is also possible to satisfactorily prevent occurrence of the wing tip vortex 100 on the rear side. That is, the vehicle 10 is able to travel further effectively thanks to the winglet 80.

The vehicle 10 of the present embodiment having the aforementioned configuration attains the following effects.

In the vehicle 10, the housing 32 of the rearview mirror 14 has on the upper wall 66 the upper outer surface portion 70 whose length in the front-rear direction is shorter than the length of the lower outer surface portion 74 of the lower wall 68 in the front-rear direction. With this configuration, the vehicle 10 is able to satisfactorily obtain the down force at the housing 32 during traveling. That is, because the traveling wind (air) flowing a long distance on the lower outer surface portion 74 flows fast while the traveling wind (air) flowing a short distance on the upper outer surface portion 70 flows slow, the pressure applied to the upper outer surface portion 70 becomes larger than the pressure applied to the lower outer surface portion 74. Thus, each housing 32 is able to gain the down force stably on the outer side in the vehicle width direction, which is separated sufficiently from the axle shaft. Accordingly, the vehicle 10 is capable of having an improved road surface follow-up property of the wheels or the like and hence traveling further stably.

Further, in the vehicle 10, the upper outer surface portion 70 has the concave surface 70a whose center portion in the front-rear direction is depressed downward, whereby it is possible to suitably receive the pressure of the traveling wind (air) coming from ahead and smoothly flow the air obliquely upward toward the rear side. Thus, it is possible to produce the down force more easily.

Further, because of being provided with the winglet 80 protruding upward at the end portion on the outer side in the vehicle width direction, the housings 32 can each prevent the wing tip vortex 100 from occurring on the outer side in the vehicle width direction due to the down force. Accordingly, it is possible for the vehicle 10 to travel stably and efficiently by suppressing loss of the down force caused by the wing tip vortex 100.

In addition to the aforementioned configuration, the winglet 80 continuously extends from the front end 71 to the rear end 72 of the upper outer surface portion 70, and thus it is possible to prevent occurrence of the wing tip vortex 100 on the entire upper outer surface portion 70.

Furthermore, in so far as the winglet 80 is configured to protrude rearward beyond the rear end 72 of the upper outer surface portion 70, it is possible to also prevent the wing tip vortex 100 from occurring on the rear side of the upper outer surface portion 70.

Still furthermore, since the vehicle 10 has the blinker device 52 inside the housing 32, it is possible to effectively utilize the interior space 54 of the housing 32 which is configured to be large in dimension in order to gain the down force.

Incidentally, the present invention is not limited to the foregoing embodiment and is able to be variously modified in accordance with the gist of the invention. For example, the upper outer surface portion 70 of the housing 32 may not have the concave surface 70a depressed inward and may be formed in an appropriate shape that enables the traveling wind to flow smoothly. Further, for example, the winglet 80 provided on the rearview mirror 14 may be configured as a separate member from the fixed housing 44 and may be firmly secured to the fixed housing 44 by suitable fixing technique such as fusing, adhesive joining, fastening or the like.

Figure 6:
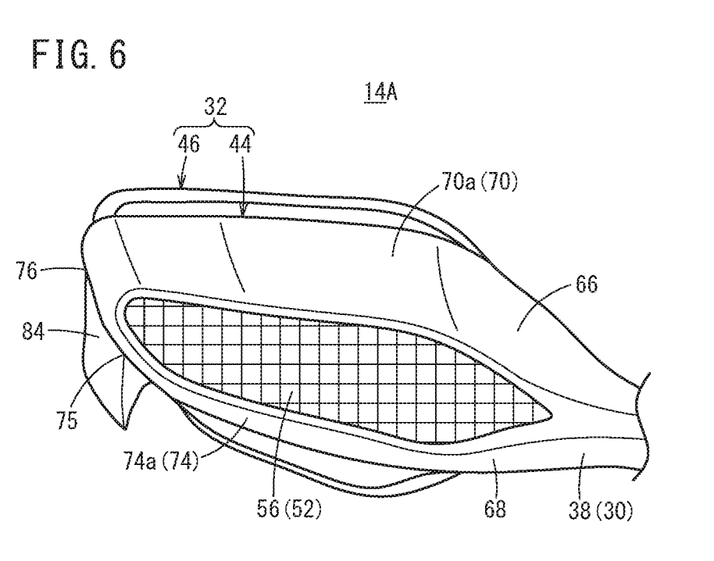
FIG. 6 is a front view showing a rearview mirror according to a modification in an enlarged scale.

Furthermore, as shown in FIG. 6, the housing 32 of the rearview mirror 14A in the vehicle 10 may take a configuration in which the winglet 84 (protruding portion) is formed so as to extend downward from the end portion on the outer side in the vehicle width direction. That is, the winglet 84 protrudes downward from the joined portion (end portion) between the upper outer surface portion 70 and the lower outer surface portion 74 in the vehicle width direction. It is preferable that, like the winglet 80 according to the present embodiment, this winglet 84 is also formed to extend from the front end 75 to the rear end 76 of the lower outer surface portion 74 (the upper outer surface portion 70) and to protrude rearward beyond the rear end 76 of the lower outer surface portion 74. Also in the case of the winglet 84 protruding downward as above, it is possible to prevent occurrence of the wing tip vortex 100 going from the upper outer surface portion 70 toward the lower outer surface portion 74.

Incidentally, the rearview mirror 14A may also be configured such that the winglets 80, 84 protrude in both directions, i.e., upward and downward, from the end portion on the outer side in the vehicle width direction of the housing 32.

Furthermore, for example, the winglet 80 may be configured such that the height from the upper outer surface portion 70, in the side view, becomes gradually higher from the front end 71 toward the rear side. This is because in the configuration that the rear end 72 of the upper outer surface portion 70 and the rear end 76 of the lower outer surface portion 74 are separated in the vertical direction, the wing tip vortex 100 becomes larger on the rear side.

Further, although the winglet 80 is formed in the shape of a triangular prism in the present embodiment, the present invention is not limited to this, and may have a configuration that the winglet 80 is formed in, for example, a quadrangular prism (polygonal shape), a semi-cylindrical shape or the like, and extends along the upper outer surface portion 70.

What is claimed is:
1. A saddle-type vehicle provided with a rearview mirror, the rearview mirror comprising:
   a stay extending from a vehicle body outward in a vehicle width direction; and a housing connected to an extending end portion of the stay and extending outward in the vehicle width direction, the housing comprising a mirror body;

wherein:

the housing further comprises an upper wall and a lower wall which are arranged at positions overlapping each other in a vertical direction of the vehicle body; and in a cross-sectional view perpendicular to the vehicle width direction, the upper wall has an upper outer surface portion whose length in a front-rear direction is shorter than a length of a lower outer surface portion of the lower wall in the front-rear direction, wherein an external surface of the upper outer surface portion is formed in a concave surface whose center portion in the front-rear direction is depressed downward.

2. The saddle-type vehicle according to claim 1, wherein:

the housing is provided with a protruding portion protruding upward at an end portion thereof on an outer side in the vehicle width direction.

3. The saddle-type vehicle according to claim 1, wherein:

the housing is provided with a protruding portion protruding downward at an end portion thereof on an outer side in the vehicle width direction.

4. The saddle-type vehicle according to claim 2, wherein:

the protruding portion continuously extends in the front-rear direction from a front end to a rear end of the upper outer surface portion.

5. The saddle-type vehicle according to claim 2, wherein:

the protruding portion protrudes rearward beyond a rear end of the upper outer surface portion.

6. The saddle-type vehicle according to claim 1, wherein:

a blinker device is disposed inside the housing.

\* \* \* \* \*